G. W. KNAPP, Jr.
BUG AND FLY TRAP.
APPLICATION FILED JUNE 8, 1912.
1,065,878.
Patented June 24, 1913.
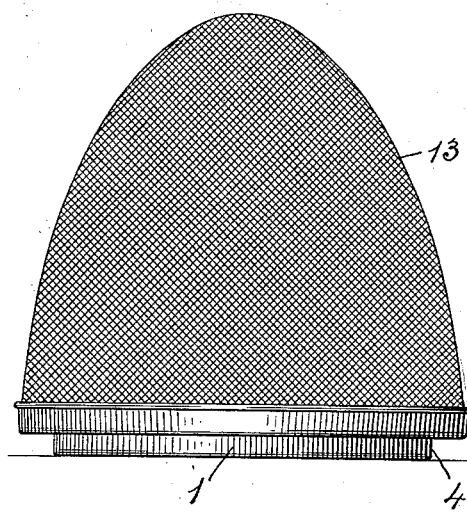
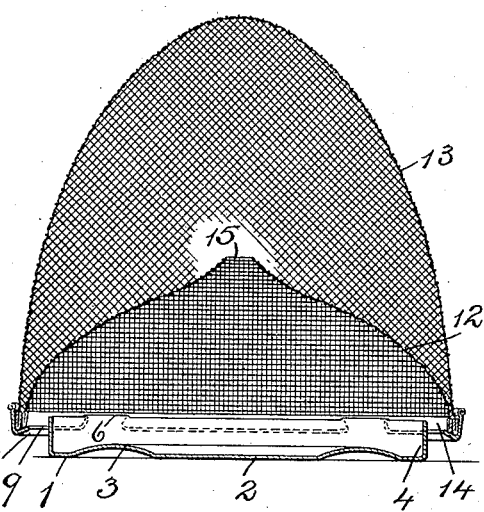
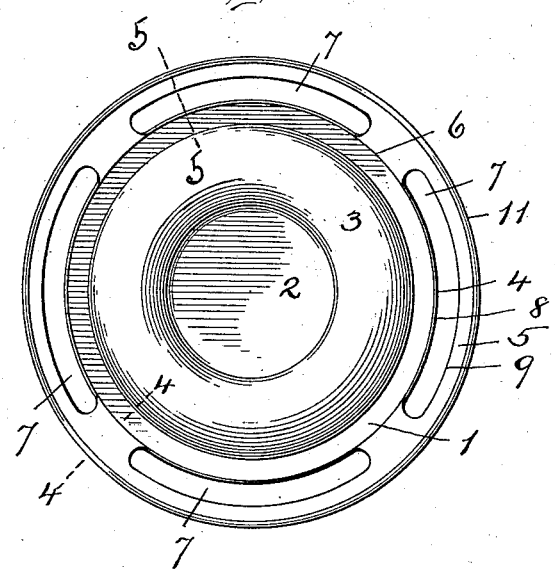
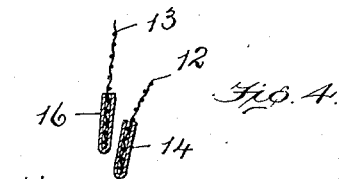
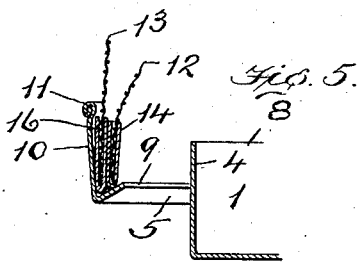
Witnesses
Edwin L. Bradford
G. Ferd. Vogt
Inventor
George W. Knapp Jr.
By
Attorneys

UNITED STATES PATENT OFFICE.

GEORGE W. KNAPP, JR., OF BALTIMORE, MARYLAND, ASSIGNOR TO NATIONAL ENAMELING AND STAMPING COMPANY, OF BALTIMORE, MARYLAND, A CORPORATION OF NEW JERSEY.

BUG AND FLY TRAP.

1,065,878.  Specification of Letters Patent.  Patented June 24, 1913.

Application filed June 8, 1912. Serial No. 702,445.

*To all whom it may concern:*

Be it known that I, GEORGE W. KNAPP, Jr., a citizen of the United States, residing at Baltimore, in the State of Maryland, have invented certain new and useful Improvements in Bug and Fly Traps, of which the following is a specification.

This invention relates to certain improvements in bait pans for bug and fly traps,—the trap being of the type that has an inner wire gauze dome with a top-opening that communicates with an outer dome.

The object of this invention is to provide a sheet-metal base or bait-pan whose bottom has a surrounding up-standing wall, and bridges that incline downwardly and outwardly from said wall and connect with an annular downwardly-inclined flange that is lower than the top-edge of said wall, and said parts forming entrance-slots which are lower than said top-edge, whereby the said wall conceals the slots from the view of flies or insects that are inside and resting on the bottom of the base-pan.

The accompanying drawing illustrates the invention wherein,

Figure 1, shows a side elevation of the assembled trap. Fig. 2, illustrates a vertical sectional elevation of the same. Fig. 3, shows a top plan view of the bait pan. Fig. 4, illustrates an enlarged sectional detail of the pan and a downwardly inclined bridge that connects with the annular flange, and also shows the lower circular edges of the two trap domes about to be seated on the flange,—the section being taken on the line 4—4 of Fig. 3. Fig. 5, is another sectional detail showing the domes seated on the annular flange, the section being on line 5—5.

In the drawing the numeral, 1, designates the bait-pan which has a flat bottom portion, 2; an annular convex bead, 3, and an upstanding wall, 4, which encircles the bottom of the pan and project therefrom vertically upward.

The vertical wall, 4, at its top has radial bridges, 6, see Fig. 4, that sustain a downwardly inclined flange, 5, which latter has position vertically considered in a plane between the top edge, 8, of the said vertical wall, 4, and the flat portion of the bottom. It will thus be noted that the annular downwardly-inclined flange, 5, depends from the top edge, 8, of the upstanding pan wall, 4.

Between the downwardly-inclined bridges is a series of entrance slots, 7, which latter have concentric edges, 8, and, 9, respectively which edges have position in different horizontal planes,—the outermost concentric edge, 9, being in a plane lower than the innermost edge, 8, which latter is the top edge of the vertical flange, 4.

An annular retaining wall, 10, is provided around the inclined supporting flange, 5, and extends upwardly therefrom. This wall, 10, also flares slightly as it extends away from the flange, 5, and its upper edge has an annular bead, 11, for a purpose presently to be described.

The cage part of the trap comprises two foraminous domes, 12, and, 13, respectively formed, in the present instance of wire. The inner dome, 12, has a circular lower edge which is bound by a sheet metal band, 14, which forms a circular hem and from said band the dome arches or curves over the center of the pan and is provided with an opening, 15, at the top. The outer dome, 13, is also provided with a band, 16, around its lower circular edge which is just enough larger than the band, 14, on the inner dome to snugly receive or take around the latter band. This outer dome entirely covers the inner dome and the lower bound edges of the two domes are of such diameter that they may be easily forced down past the head, 11, on the wall, 10, of the supporting flange, 5, and be seated on the said inclined supporting flange between the lower slot edge, 9, and the higher rim-edge, 8, as shown in Figs. 2 and 5.

In practice the bait will be placed on the central flat base portion, 2, where it is confined by the annular convex bead, 3, and prevented from spreading to the vertical rim flange, 4, where it would be troublesome to clean. The flies or insects must pass up through the segment entrance slots, 7, and then over the high edge, 8, of the pan then downward to reach the bait, which is deposited in the center of the pan base. When the flies are on the base however, the slots, 7, which are below the rim edge, 8, are concealed from the flies by the top of the interposed upstanding wall, 4, and the only opening to the light which the fly or insect can see is the opening, 15, in the top of the inner dome, and therefore escape is sought through that opening with the result that the fly or insect is effectually trapped.

Some bug and fly traps have the slots through which the insect enters so positioned that it is quite easy for the insect, after it has entered through the slot to the base-pan, to return and escape by the slots, but my improved construction tends to conceal the slots to the view of the insect after it has passed in to the pan, and renders escape more difficult.

Having thus described my invention what I claim and desire to secure by Letters Patent is:—

A bug or fly trap having a base pan with a circular upwardly-extending wall said base pan also having an annular flanged wall encircling the pan in a plane below the upper edge of the circular wall of the pan and the annular wall around the circular pan wall having a series of circumferentially-extending segment slots,—the outer edge of each segment slot being in a plane lower than the inner edge of each slot and a wire-gauze dome having its lower edge sustained on the annular wall below and encircling the outer edges of all the segmental slots.

In testimony whereof I affix my signature in presence of two witnesses.

GEORGE W. KNAPP, Jr.

Witnesses:
JOSEPH SCHAPIRO,
LOUIS C. KLERLEIN.

---

Copies of this patent may be obtained for five cents each, by addressing the "Commissioner of Patents, Washington, D. C."